United States Patent [19]
Wetherbee

[11] Patent Number: 5,937,409
[45] Date of Patent: Aug. 10, 1999

[54] INTEGRATING RELATIONAL DATABASES IN AN OBJECT ORIENTED ENVIRONMENT

[75] Inventor: Jonathan Wetherbee, San Mateo, Calif.

[73] Assignee: Oracle Corporation, Redwood Shores, Calif.

[21] Appl. No.: 08/901,738

[22] Filed: Jul. 25, 1997

[51] Int. Cl.⁶ .................................................. G06F 17/30
[52] U.S. Cl. .................................. 707/103; 707/1; 707/2; 395/683
[58] Field of Search .................................. 707/2, 8, 9, 10, 707/102, 201, 204, 501, 1, 103; 711/112; 345/333, 339, 356; 348/7; 395/683

[56] References Cited

U.S. PATENT DOCUMENTS

| | | | |
|---|---|---|---|
| 5,235,701 | 8/1993 | Ohler et al. | 395/600 |
| 5,297,279 | 3/1994 | Bannon et al. | 395/600 |
| 5,499,371 | 3/1996 | Henninger et al. | 395/700 |
| 5,615,362 | 3/1997 | Jensen et al. | 395/614 |
| 5,627,979 | 5/1997 | Chang et al. | 395/335 |
| 5,659,735 | 8/1997 | Parrish | 707/10 |
| 5,737,601 | 4/1998 | Jain | 707/201 |
| 5,752,245 | 5/1998 | Parrish | 707/10 |
| 5,805,804 | 9/1998 | Laursen | 348/7 |
| 5,806,075 | 9/1998 | Jain | 707/201 |
| 5,819,251 | 10/1998 | Kremer | 707/1 |
| 5,819,256 | 10/1998 | Ozbutun | 707/2 |
| 5,826,085 | 10/1998 | Bennett | 395/683 |

*Primary Examiner*—Thomas G. Black
*Assistant Examiner*—Diane D. Mizrahi
*Attorney, Agent, or Firm*—Fliesler, Dubb, Meyer & Lovejoy LLP

[57] ABSTRACT

A relational mapper supports the storage of objects from an object oriented environment in one or more relational databases. The relational mapper generates tables in a relational data store for abstract class types, and it generates a mapping, in any predetermined relationship, to map at least one member of an object to a table for the class type in the relational data store. The relational mapper maps members of a class type to members of a data source. A storage type map is generated to map the data source members of the data source to columns of the relational database table for the class type. The relational mapper is bidirectional such that the relational mapper maps data from a relational database to create objects in accordance with a type system of an object oriented environment. The relational mapper generates metadata to describe the object such that the object, created from the relational database, is a full fledged object of the object oriented system.

36 Claims, 14 Drawing Sheets

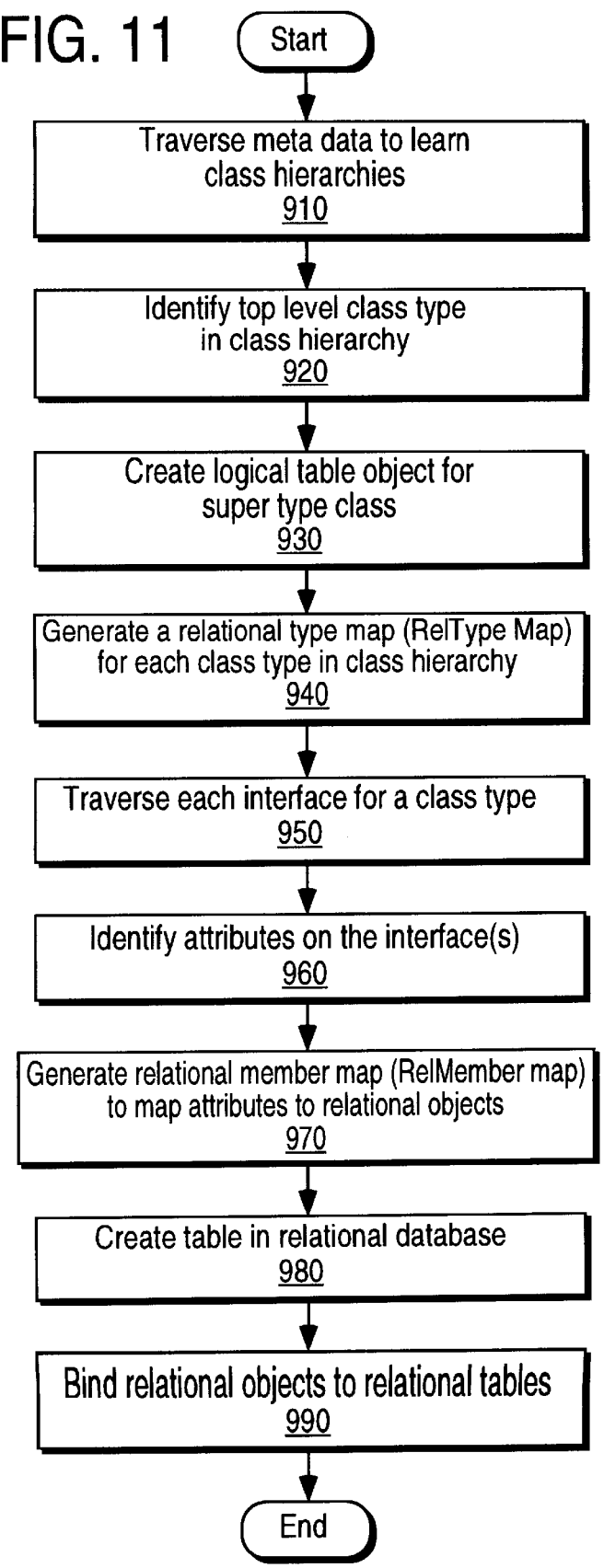

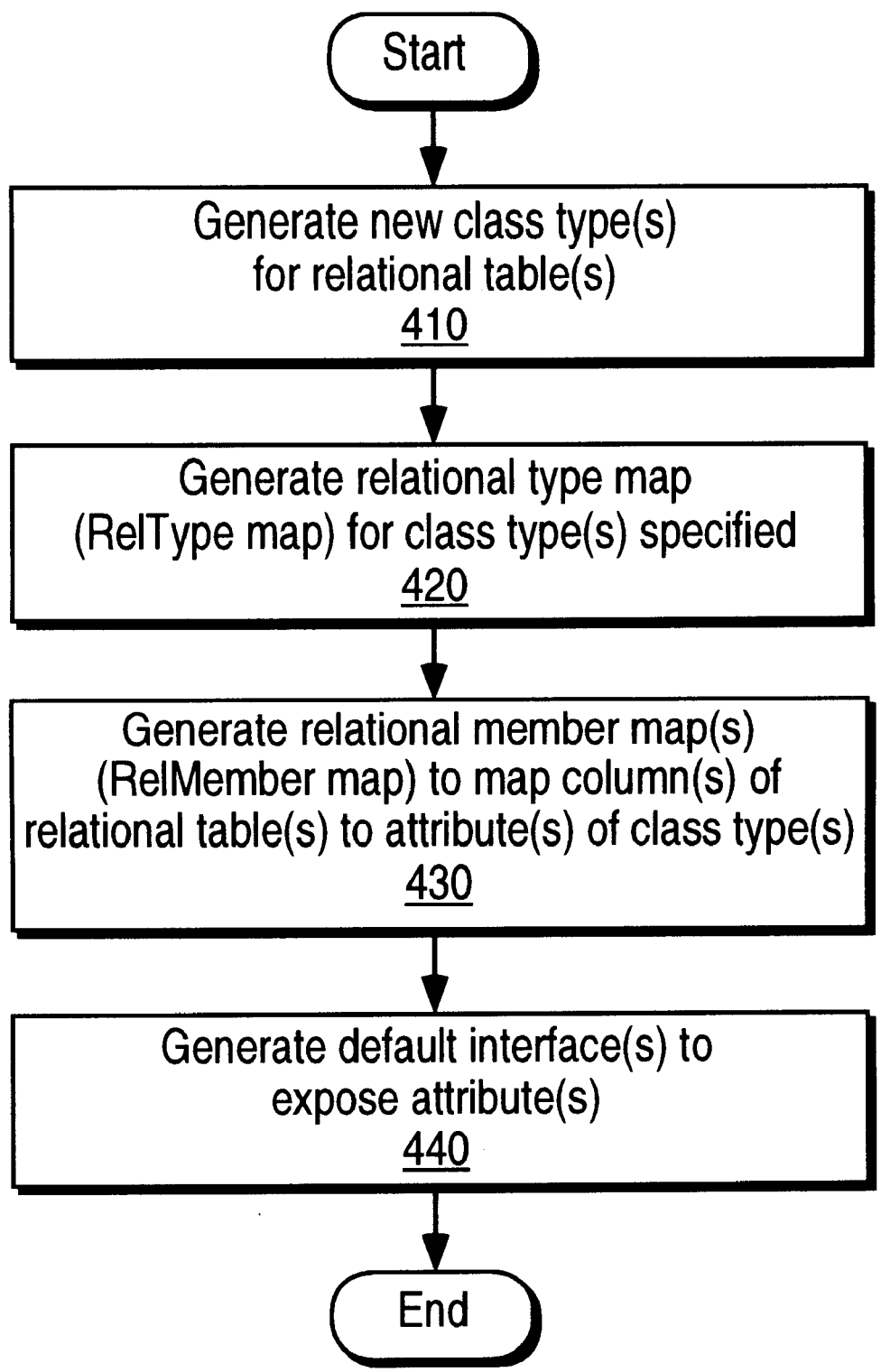

INTEGRATING RELATIONAL DATABASES IN AN OBJECT ORIENTED ENVIRONMENT

BACKGROUND OF THE INVENTION

1. Field of the Invention

The present invention is directed toward the field of object oriented software systems, and more particularly to an object oriented system that fully integrates relational databases.

2. Art Background

An object oriented approach to programming provides many advantages over traditional procedural programming approaches. For example, an object oriented approach permits code reuse through implementation of inheritance and modularity through implementation of encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as class types. For purposes of nomenclature, the object oriented programming environment described herein defines classes as class types. A class type is a general abstract specification, and an object instantiated from a class type is a specific concrete instance of the class type.

A class type consists of an interface and an implementation. The interface comprises variables and function declarations, wherein the variables represent the attributes of the class type, and the function declarations specify methods for manipulating those attributes as well as performing other operations. The declaration specifies the name, return type, and argument, known collectively as the signature. The implementation refers to the actual code that implements the methods specified in the interface. Class types may consist of abstract types or implementation types. Objects are not instantiated from abstract types. Instead, objects are instantiated from implementation types.

Object oriented languages, such as the C++ language, permit the creation of special types via inheritance. In general, inheritance is a mechanism for passing attributes and methods from a parent or base type to one or more child or derived types. Inheritance permits code reuse because interfaces and implementations need not be duplicated in the child type. Instead, the interfaces and implementations may be incorporated in any child type through reference to the parent or base type.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

The concept of isolating the implementation of the methods and attributes within an object is known as encapsulation. Encapsulation is a powerful feature of object oriented systems because it separates the external part of an object (e.g., the part exposed to the objects user) from the internal part (e.g., the structure and implementation). Therefore, encapsulation permits changing the object implementation without affecting the interaction with other functions or objects as long as the interface does not change.

In general, databases are used to store data for use by database clients, such as application programs. One type of database used in software systems is a relational database. In general, a relational database stores information in the form of tables. Typically, relational databases include software that permit a user, through use of a query language, to visualize different portions and combinations of these tables.

Object oriented programming environments utilize databases. For example, an object oriented software system uses databases to store instances of objects so that the objects "persist" in the database. Object oriented software systems, which include encapsulated data and methods, do not have a direct counterpart with the relational model. For example, an object may include several attributes, specified by the class type, that define the state of the object at a particular time. To store the attributes of an object, an object oriented concept, in a relational database, a mapping of the attributes of the object to columns and rows in one or more tables is required.

There are several different data stores used in object oriented systems. Typically, the different data stores are not directly compatible in that each data store has specific requirements for executing transactions. Thus, an object oriented system must specifically interface with every different data store used in the system. For example, a client may request a row from a table in a relational data store. However, if there are multiple relational data stores, then each relational data store may require a specific dialect to execute the transaction to obtain the row. Furthermore, in an object oriented system that integrates several different object systems (e.g., an object oriented system that implements foreign objects), each object system must conduct transactions specifically for the target data store.

Some prior art systems contain interfaces to generically access a data store, such as a relational database. For example, the Open Database Connectivity (ODBC) specification sets forth a standard interface to access databases. These standard interfaces provide uniform access to a database so that the object oriented system is not required to retain knowledge of the particular aspects necessary to perform transactions in every data store used in the system. Although such a standard interface simplifies access to data stores, such as relational databases, the standard interfaces still require the client, such as a client in an object oriented system, to have a notion of the relational model (e.g., tables, columns and rows). For example, the standard interface may provide, through a standard access operation, a mechanism that obtains a particular row in a relational table. However, the client in the object oriented system must utilize the relational database in terms of columns and rows. Therefore, it is desirable to integrate relational data stores into an object oriented system without requiring the clients of the object oriented system to retain specific knowledge of the relational model or the particulars of executing transactions in one or more relational data stores.

SUMMARY OF THE INVENTION

A relational mapper supports the storage of objects from an object oriented environment in one or more relational databases. In general, the objects are instantiated from an abstract class type, and the abstract class type is defined in accordance with a type system that includes at least one type system member. For example, a type system member may include attributes. In general, the relational mapper assigns a table in a relational data store for each abstract class type supported by the relational data store. In addition, the relational mapper generates a mapping, in any predetermined relationship, to map at least one member of an object to a column of a table for the class type in the relational data store.

In one embodiment, the relational mapper generates, to map an object to a relational database, a data source that includes data source members. In general, a data source is a mechanism to define an implementation or schema for a class type that permits defining or describing data structures. The relational mapper generates a storage type map to map a data source to a relational table, and it generates relational member maps to map each data source member to a column of the relational database table for the class type. In one embodiment, the relational mapper, through use of the storage type map, maps each data source member of an object to a column in a table for the corresponding class type. Specifically, the relational mapper supports mapping a scalar attribute of an object to a column of a table in a relational database that corresponds to the class type of the object. Also, the relational mapper maps complex scalar reference attributes of an object to a column of a table in a relational data store that corresponds to a class type of an object referenced, and it maps collection reference attributes of an object to a table in a relational data store that corresponds to a class type of a collection referenced.

The relational mapper is bi-directional such that the relational mapper also maps tables from a relational database to create objects in accordance with a type system of an object oriented environment. In one embodiment, the object oriented system describes all objects in metadata. Thus, to map the data from a relational database, the relational mapper generates metadata to describe the object as a class type. In this way, the object, created from the relational database, is a full fledged object of the object oriented system. The columns of a relational database table are thus mapped to the class type and interface type members of a class type defined by the type system of the object oriented environment.

BRIEF DESCRIPTION OF THE DRAWINGS

FIG. 11 is a flow diagram illustrating a process for mapping class types to relational tables in accordance with one embodiment for auto mapping of the present invention.

FIG. 12 is a flow diagram illustrating one embodiment for an auto mapping method executed in the relational mapper.

DETAILED DESCRIPTION OF THE PREFERRED EMBODIMENTS

Figure 1:
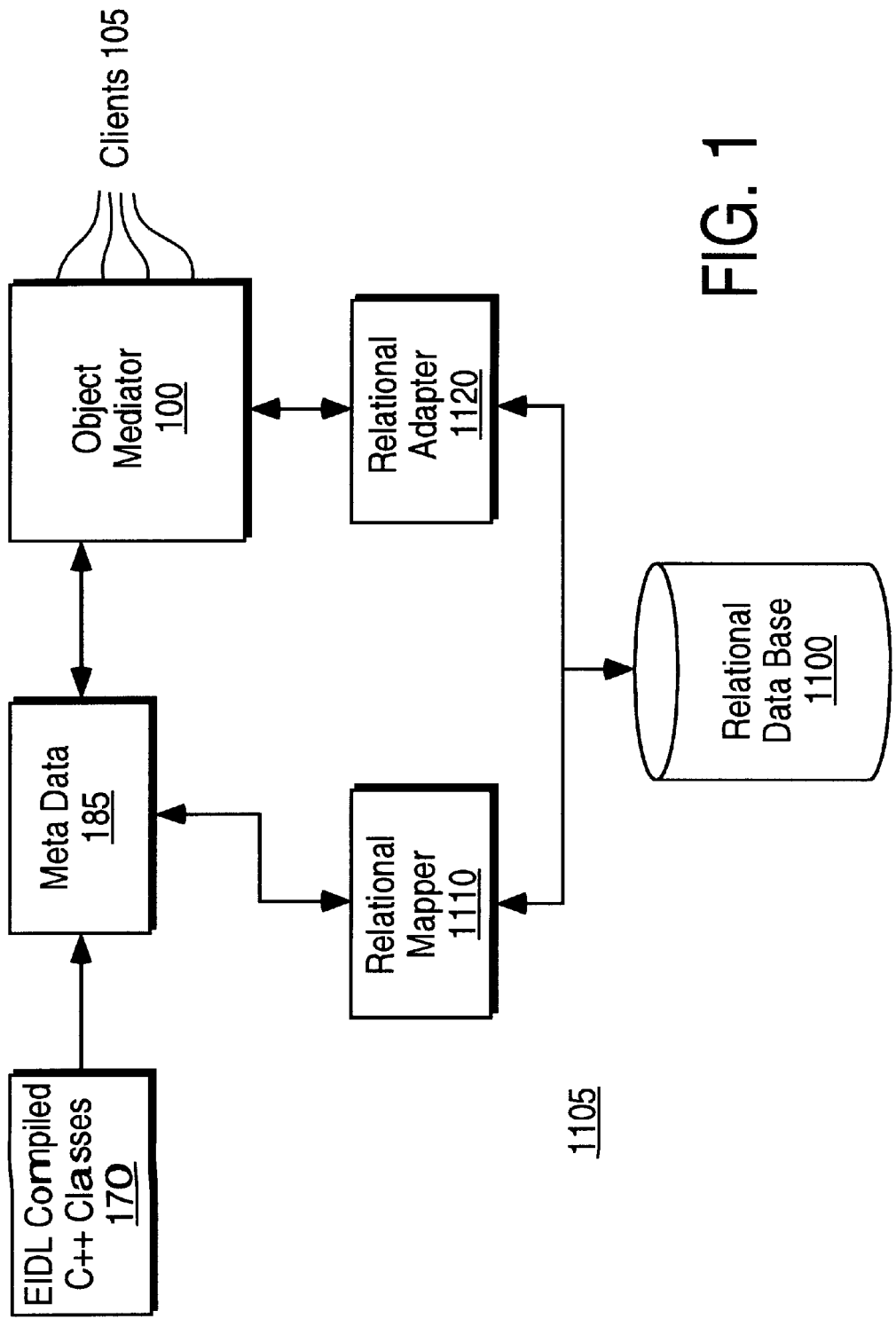
FIG. 1 is a block diagram illustrating an object oriented software system including a relational database.

Relational Mapping System:

The integration of relational databases in object oriented software systems has application for use in an object oriented software development environments. FIG. 1 is a block diagram illustrating an object oriented software system including a relational database. In one embodiment, the object oriented system 1105 is part of an object oriented software development environment. The software system 1105 shown in FIG. 1 contains a relational database 1100 to store objects and data for use in the object oriented software environment. Although the block diagram of FIG. 1 includes a single relational database 1100, one or more databases or data stores may be integrated into the object oriented system. The relational database 1100 includes transactional and query support in accordance with the relational model. In one embodiment, the relational database 1100 comprises an Oracle® 7 relational database.

The software system 1105 also contains an object mediator 100 that exposes objects to clients. In general, clients, labeled 105 in FIG. 1, are defined as any code or program, such as object oriented development tools, that utilizes the resources of the object oriented software system 1105. In general, the clients 105 utilize data, in the form of objects, that persist in the relational database 1100. For example, a client may instantiate an object that persists in the relational database 1100.

As shown in FIG. 1, the object oriented software system 1105 includes metadata 185. Metadata 185 fully describes all objects, and relationships between objects and relational tables resulting in a software system that is 100% metadata driven. As described more fully below, with a 100% metadata system, a user is not required to write code to implement persistence of any piece (e.g., object to table, or table to object). The object mediator 100 utilizes the metadata 185 to expose objects and data to the clients 105. The metadata 185 supports a meta model based software system. In a meta model software system, all objects, registered with the object oriented system, are defined or described by metadata. The metadata 185 may be generated from multiple sources. For the embodiment of FIG. 1, the metadata 185 is generated for C++ compiled classes via an extended interface definition language (EIDL) compiler. In part, the EIDL compiler generates metadata to describe all of the C++ compiled classes registered with the type system of the object oriented system. In addition, as described below, the relational mapper and the relational adapter of the present invention generate metadata. Furthermore, metadata may be generated from external sources, such as diagramming and modeling tools.

The object oriented software system 1105 further includes a relational mapper 1110. The relational mapper 1110 is used to integrate the relational database 1100 into the object oriented system 1105. In part, the relational mapper 1110 supports persistence of any object described in the metadata 185 for storage in the relational database 1100. For example, the relational mapper 1110 supports persistence of instances of compiled C++ classes described in the metadata 185. Furthermore, as described more fully below, the relational mapper 1110 permits querying by attributes certain objects stored in the relational database 1100 (e.g., a queryable object depends upon the mapping of the object to the relational database table).

In general, the relational mapper 1110 generates maps or tables, stored as metadata, to map selected objects registered with the object oriented system to the relational database 1100. For example, EIDL compiled C++ classes, stored as metadata, are mapped to tables in the relational database 1100 to support persistence of instances of these types or classes. The relational mapper 1110 is bi-directional. In addition to mapping objects to the relational database 1100, the relational mapper 1100 maps tables of the relational database 1100 to expose these tables as class objects in the object oriented system.

The object oriented software system 1105 further includes a relational adapter 1120. The relational adapter 1120 is utilized as part of the persistence mechanism to access and query objects during run time. In general, the relational adapter 1120 provides an implementation for the mapping metadata. The relational adapter 1120 supports, at run time, general access to objects stored in the relational database 1100. To dynamically access an object stored in the relational database 1100, a client 105, through interface mechanisms in the object mediator 100, obtains a connection to the relational adapter 1120. Once a connection is obtained, the relational adapter 1120 utilizes the mapping, expressed as metadata, to execute a desired transaction. For example, the relational adapter 1120 accesses rows in tables specified by client(s) 105 to store attributes in accordance with the relational mapping. Accordingly, the relational adapter 1120 utilizes the metadata to populate the attributes in a persistent object. Thus, the relational mapper 1110 maps objects at the type system level, through generation of metadata, to describe mapping from a particular abstract class type to the relational model. In response to requests for instances of an abstract class type, the relational adapter 1120, using the predefined mapping, specifies rows of the pre-mapped table for instances of the abstract class type to populate the attributes of the implementation class type.

As discussed above, for this embodiment of an object oriented software system, all objects are described by metadata. In general, a static object is defined as an object compiled prior to run time. For example, integration of C++ classes may be characterized as a static operation, such that the C++ classes are compiled prior to run time. A dynamic object may be implemented in the object oriented system at run time without a separate compile phase. Because the metadata describes all of the objects in the system, there is no distinction between objects supported and generated through the object oriented system 1105 (e.g., static objects), such as objects compiled as C++ classes, and dynamic objects generated through the persistence mechanism (e.g., the relational mapper 1110 and relational adapter 1120). Thus, the object oriented system unifies dynamic objects, implemented through the relational mapper 1110 and relational adapter 1120, and static objects previously compiled.

In one embodiment, the operations of the relational mapper 1110 are executed during a design time to generate a mapping from the object oriented classes to tables in the relational database 1100. Although class types are initially mapped in the relational mapper 1110 during a design time phase, the relational mapper 1110 operates in a dynamic environment. For example, if an abstract class type object is instantiated into an implementation class type object, then the relational mapper 1110 generates new metadata to define the mapping of the new abstract class type down to the relational database 1100.

The mapping of relational databases into the object oriented system may be characterized as a dynamic process. As discussed above in the background section, in prior art data store integration techniques, C++ headers, which require compiling, are generated to specify the mapping. Thus, the prior art C++ headers may be characterized as static. In contrast, the relational mapper 1110 generates metadata mappings after class types are defined. During run time, the relational adapter 1120 dynamically implements objects based on class types and mapping available from the metadata.

In general, the relational model specifies a way of storing, accessing, and viewing data stored in relational databases. However, a relational database does not have characteristics of a typical object (e.g., attributes, methods or operations). The relational mapper 110, during design time, and the relational adapter 1120, during run time, dress or wrap data from a relational database to present the data in the object oriented system as an object. Specifically, the relational adapter 1120 provides a dynamic implementation for a class type using class type metadata. Thus, the relational mapper 1110 and relational adapter 1120 create a notion of an object, compatible with the type system of the object oriented system, for data stored in the relational database 1100. In one embodiment, all objects accessible in the object oriented system are objects defined by a superset type system (e.g., uniform object model objects). Thus, all objects, including data originating from a relational database, may be treated in a uniform manner.

The object mediator 100 includes a plurality of interfaces to execute transactions to the relational database 1100. In one embodiment, the object mediator 100 includes an interface I__Persistentstore. In general, the interface I__Persistentstore identifies mapping information, based on the class types and data source, to execute a transaction in a relational database for the particular schema. The object mediator 100 also includes an interface I__Object that permits access to objects. For this embodiment, the relational adapter 1120 directly supports the I__Object interface.

A client 105, through use of Visual Basic or any scripting language (e.g., a fourth generation language), uses the I__Object interface with the relational adapter 1120 to execute, for example, a Get/Set attribute operation. The object mediator 100 further includes an I__Adapter connection interface that includes a query sync method. When called, the query sync method returns a collection and a parse tree. The parse tree provides a way to specify the query. When a query is executed by a client, the object oriented software system 1105 supports a bona fide object as specified by the metadata. For example, if a client queries a C++ class type persistent in the relational database 1100, the client views the object as a C++ class type object (e.g., the client does not perceive the object as row sources in a relational database).

To query an object, the client passes a script to the adapter connection for the relational adapter 1120, and a collection of objects that support the I__Object interface is returned. The client accesses the object through the interface. For example, the object oriented system may contain a number of button objects that permit easy implementation of several buttons for a graphical user interface. To query the available button object instances, the client establishes a connection to the relational adapter 1120. For each persistent instance, the relational adapter creates a C++ button object through use of a factory. The relational adapter 1120 creates an object, through use of an object factory, and it loads the newly created object using the relational map for the button object. Furthermore, the relational adapter 1120 returns a collection of interfaces to the button objects. The client accesses the button objects through the interfaces that expose the button class type.

Figure 2:
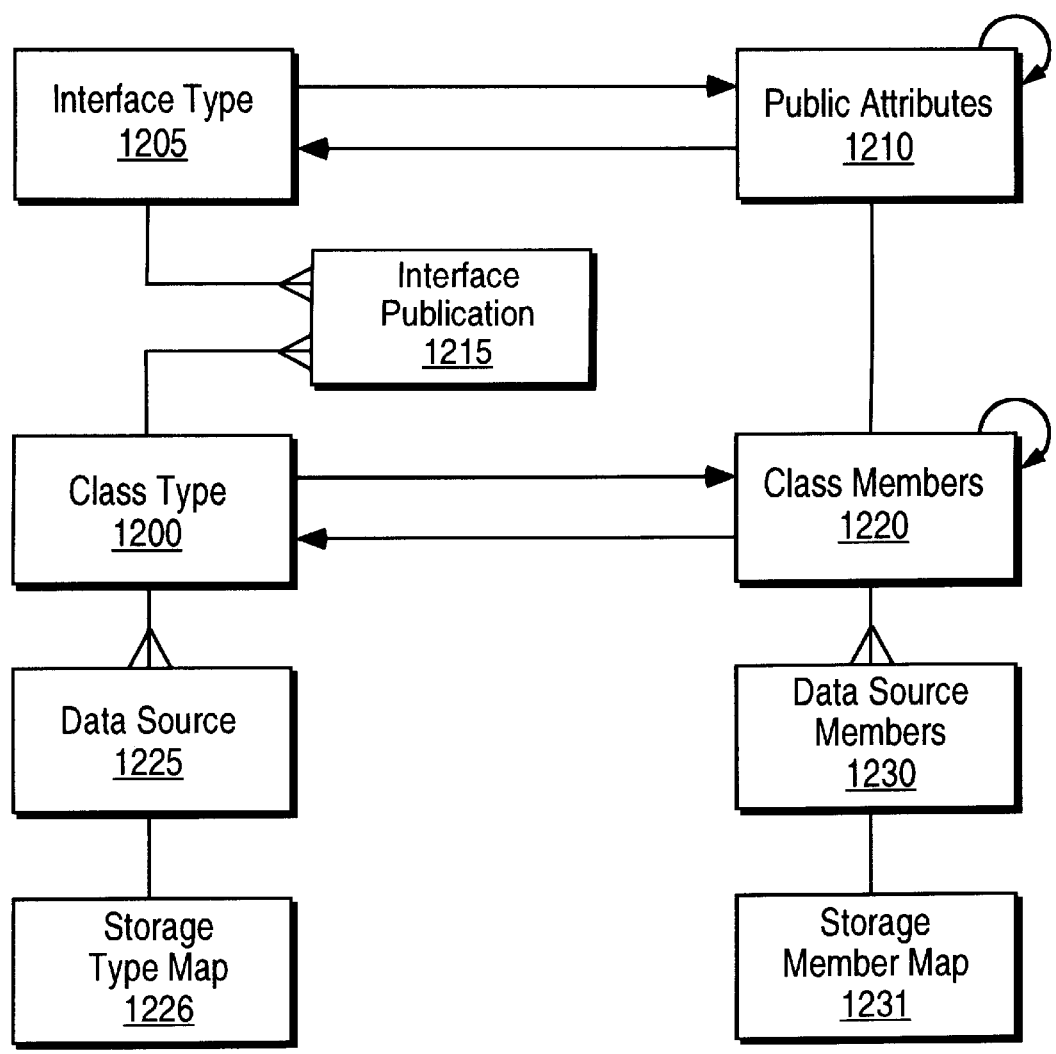
FIG. 2 is a block diagram illustrating one embodiment of a type system for use with the relational mapper of the present invention.

FIG. 2 is a block diagram illustrating one embodiment of a type system for use with the relational mapper of the present invention. As shown in FIG. 2, the type model includes, in part, a class type 1200. As is well known in the art of object oriented programming, the class type is a general "specification" from which objects are developed. Members of the class type 1200 include one or more interface types 1205, each of which in turn exposes one or more attributes (e.g., public attributes), labeled 1210 on FIG. 2. Interface publication 1215, designated as a one to many relationship between interface type 1205 and class type 1200, effectively exposes, through publication, each interface type 1205 on the class type 1200.

The type model shown in FIG. 2 further includes members of the type system shown on the right side of the drawings (e.g., public attributes 1210, class members 1220, and data source members 1230). The public attributes 1210 represent all of the attributes exposed by the interface type 1205 (e.g., those attributes typically exposed through an interface supported by a class type). As shown by the two lines with arrows in FIG. 2, there is a two way association between the public attributes 1210 and the interface type 1205. This represents the capacity of the type system to support a representation, either one way or binary, among members of the public attributes 1210 and an interface type 1205.

The public attributes 1210 are further refined by class members 1220. In general, the class members provide two functions: class members expose private attributes on the class type 1200; and class members allow associations among class types (e.g., the refinement with class members permits not only association among interfaces supported by a class, but permits constraints to define associations between class types themselves). The associations between class members 1220 and class type 1200, either one way or binary, is represented in FIG. 2 by the two lines with arrows indicating the directions of association among class members of an implemented class.

In general, attributes may be defined directly on the class type level such that the attributes are not exposed on an interface supported by the class. Because these attributes are not exposed through an interface, they are referred to as "private attributes." The type model of the present invention permits persistence of private attributes of an implementation through the class members 1220. Thus, private attributes may persist in a data store through use of the class members 1220.

Figure 3:
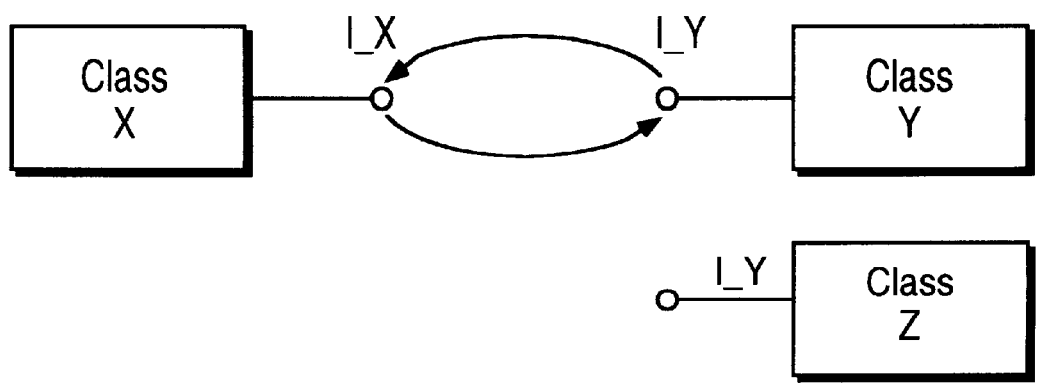
FIG. 3 is a diagram illustrating the use of class members to permit a user to constrain an association between class types.

FIG. 3 is a diagram illustrating the use of class members to permit a user to constrain an association between class types. For this example, a user desires to set up a binary association between role descriptors of class type "X" with role descriptors of class type "Y." The desired association between role descriptors is depicted by the lines and arrows between an interface X (I_X), which is supported by class X, and interface Y (I_Y), supported by class Y. However, as indicated on FIG. 3, class Z also supports interface Y (I_Y).

Typically, if I_X is associated with a collection of I_Y, then an association to a collection of all classes that support I_Y is formed. The class members 1220 permit refining the association to constrain the association to selective class types. The class members 1220 for an implementation are exposed as metadata, and therefore the information that defines associations among role descriptors (e.g., information to constrain associations between class types) is available on the metadata level.

Referring again to FIG. 2, the type model also includes, on the type side (e.g., the left side), data source 1225, and data source members 1230 on the member side (e.g., the right side). In general, a data source is a mechanism to define an implementation or schema for a class type that permits defining or describing data structures (e.g., data structures provide a format for the persistence of data). The data structures, for a particular implementation or schema, provide a further refinement to associate role descriptors. As shown by the notation of FIG. 2, there is potentially a one to many relationship between class type 1200 and data source 1225, as well as between class members 1220 and data source members 1230. The one to many relationship supports the notion that there may be several implementations or schemas for a particular class type and corresponding class members.

Data source members 1230 permit a further refinement of role descriptors. For example, a user may define, for a particular schema, an attribute of an employee class type, such as employee name, as an element of the data source. For this example, the user may further define all other attributes of the employee type as a second element (e.g., a variable string of the type varchar). For this example, the user may refine the association beyond the class type level by specifically including the "employee name" role descriptor in an association. Through use of data sources, the association refinement, which permits associations of data source elements, is specified as metadata. The metadata information allows manipulation and editing of the schema because association information, down to the data source element level, is available.

The type model of FIG. 2 further includes, to implement a persistence mechanism, a storage type map 1226 and a storage member map. In general, the storage type map providing a mapping between class type and a persistence mechanism, such a relational database table or an object oriented database. The storage member map maps each data source element of a data source to a persistence mechanism. For example, a relational member map maps data source elements to a relational database. Relational type maps and relational member maps, for use with a relational database, is described more fully below.

Although not shown in the block diagram of FIG. 2, the type system may include additional members. For example, members of the class type may also include message passing facilities and operations /methods,. The members of the type system shown in FIG. 2 is merely exemplary, and other type system members may be mapped using the techniques described herein without deviating from the spirit and scope of the invention.

Figure 4:
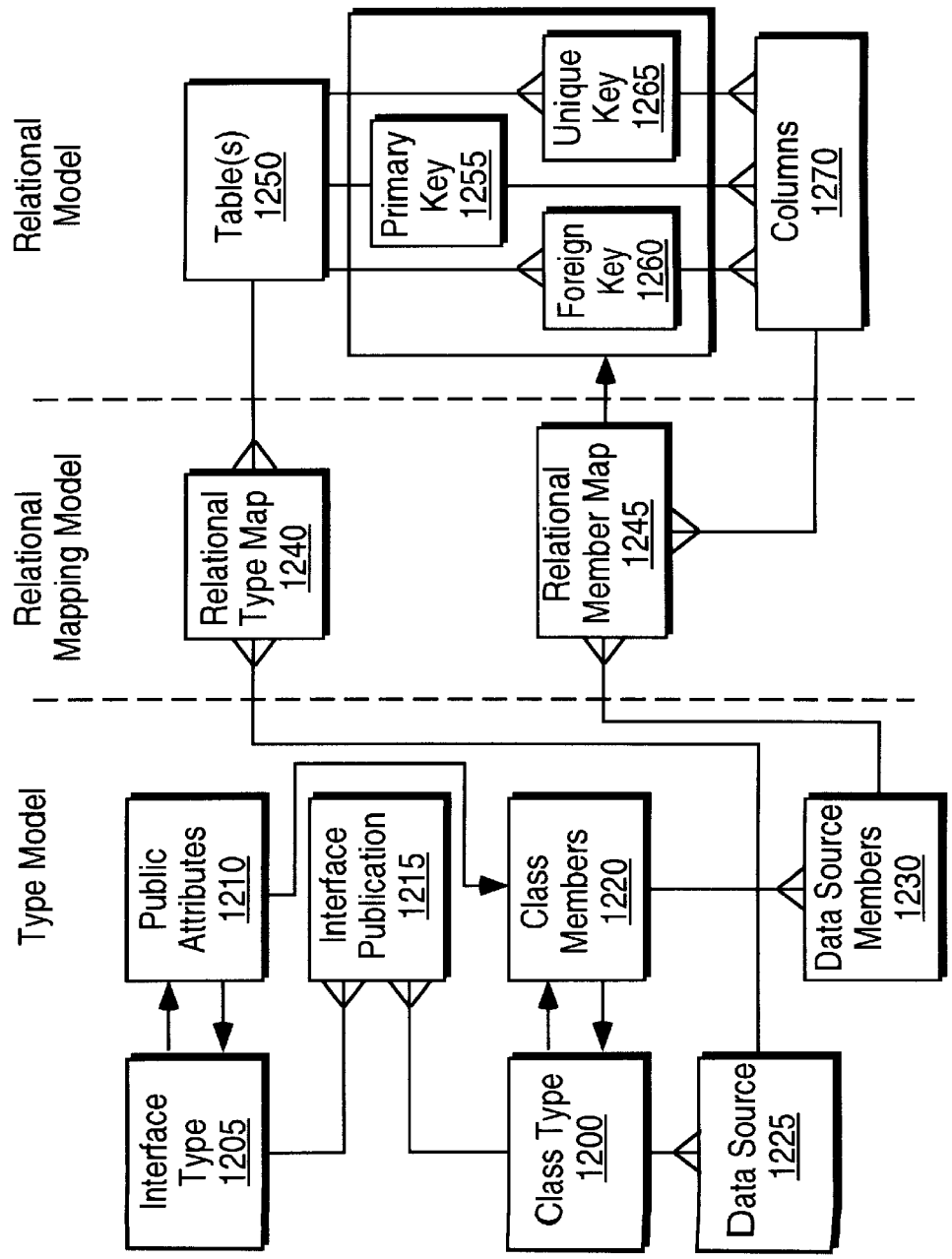
FIG. 4 is a block diagram illustrating one embodiment for relational mapping between a type model and a relational model.

FIG. 4 is a block diagram illustrating one embodiment for relational mapping between a type system of an object oriented environment and a relational model. The block diagram of FIG. 3 includes a type model, for an example type system, a relational model, for implementing a relational database, and a relational mapping model for mapping the type model to the relational model. For this embodiment, the type model is the type model shown in FIG. 2 and described above. The relational model shown in FIG. 4 includes table(s) 1250, foreign key 1260, primary key 1255, unique key 1265, and columns 1270. As is well known in the art of relational databases, the foreign key 1260, primary key 1255, and unique key 1265 are used to identify tables, columns and rows in a relational database. The columns 1270 are used to identify specific columns within a table identified by the keys.

FIG. 4 also shows relational mapping model elements that map the type model components to the relational model components. For this embodiment, the relational mapping model contains a relational type map (RelTypeMap) 1240 and a relational member map (RelMemberMap) 1245. In general, the relational type map (RelTypeMap) 1240 maps data sources to a table in a relational database. The relational member map (RelMemberMap) 1240 maps members 1230, which includes public and private class members 1220, for a corresponding class type 1200, to columns in a table identified by the relational type map (RelTypeMap) 1240. The relational member map (RelMemberMap) 1240 also identifies a table so that at run time the relational adapter 1120 references the relational member map (RelMemberMap) 1240 to run a query to extract data from the associated table. Although not shown in FIG. 4, other type system members may also be mapped to the relational model. Thus, the relational mapping model maps abstract class types, potentially refined by data sources, to tables in a relational database, and it maps class members of the class types, potentially refined by data source members, to columns, identified by keys.

Figure 5A:
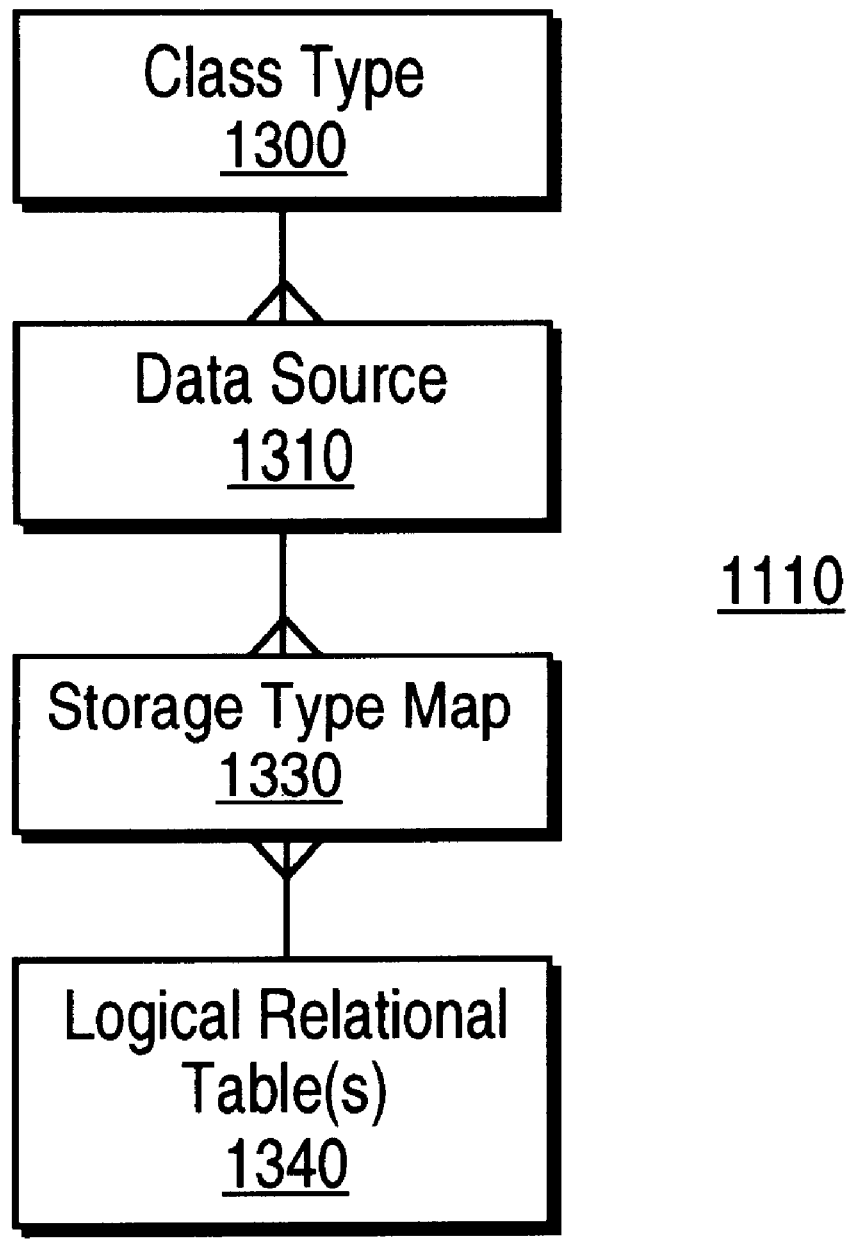
FIG. 5a is a block diagram illustrating one embodiment of relational mapping.

Relational Mapping Overview:

FIG. 5a is a block diagram illustrating one embodiment of relational mapping. In one embodiment, the relational mapper 1110 utilizes data sources. In general, data sources are data structures used to define role descriptors between class types. As described above, data sources include data source members. As shown in FIG. 5a, a class type 1300 corresponds to a data source. The connector between the class type 1300 and the data source 1310 indicates the possibility of more than one data source for each class type. Examples and use of data sources is described more fully below.

The relational mapper 1110 shown in FIG. 5a further includes a block for a storage type map 1330 and a block for a logical relational table 1340. In a preferred embodiment, the logical relational table 1340 comprises objects that describe a relational table; however, the logical relational table 1340 is not initially bound to a specific relational database implementation. A data source 1310 maps to a logical relational table 1340 via a storage type 1330. In one embodiment, the storage type map 1330 maps each data source member in the data source 1310 to a column in the logical relational table 1340. As shown by the notation that connects the data source block 1310 with the storage type map block 1330, a data source maps to a single storage type map. Similarly, a logical relational table 1340 typically corresponds to a single storage type map. However, a logical relational table may correspond to multiple storage type maps. For operation in the object oriented system, the relational mapper 1110 stores the data source structure 1310 and storage type map 1330 as metadata for subsequent access by the relational adapter 1120.

The relational mapper is bidirectional such that the relational mapper maps data from a table of a relational database to create objects in accordance with a type system of an object oriented software environment. In one embodiment, the object oriented system describes all objects in the metadata. Thus, to map data from a table in the relational database, the relational mapper utilizes the table's metadata to create class type and interface definitions. The relational mapper also generates metadata to describe the newly created class type/interface definitions. In this way, objects, instantiated from the class type, supported by the default interfaces, and populated with data from a table of the relational database, are full fledged objects of the object oriented system. In one embodiment, to generate class type and interface definitions from a relational database table, the relational mapper maps the columns of a relational database table to attributes on the newly created interfaces. The created class type is defined by the type system of the object oriented environment.

Figure 5B:
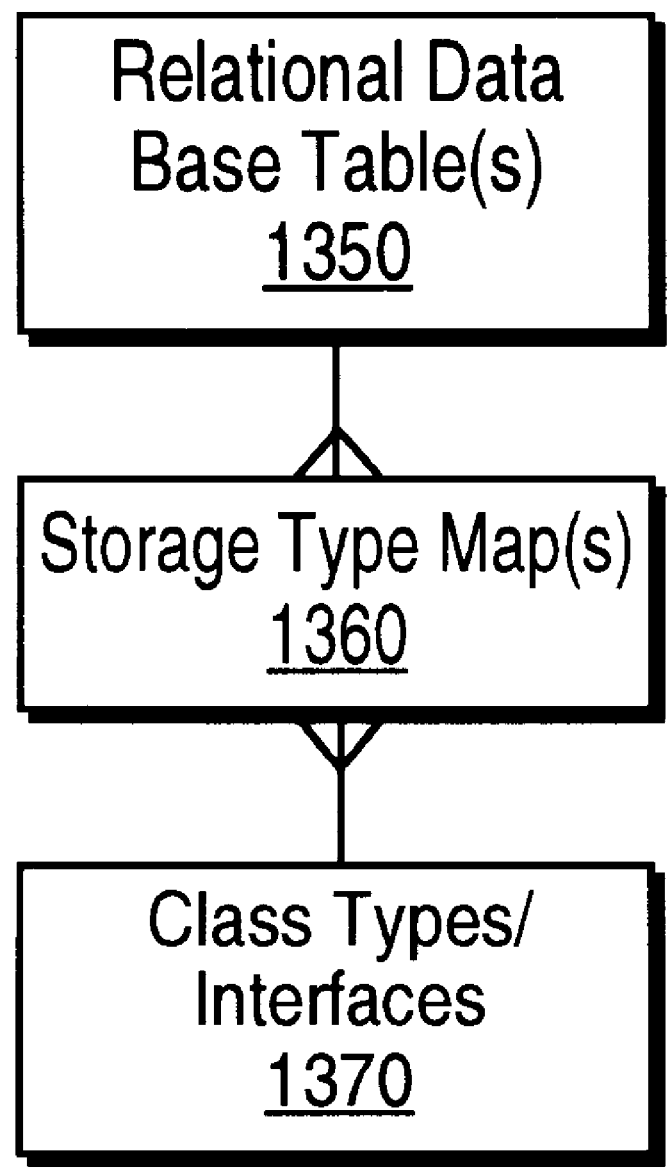
FIG. 5b is a block diagram illustrating the mapping from a table in a relational database to class type and interface definitions.

FIG. 5b is a block diagram illustrating the mapping from a table in a relational database to class type and interface definitions. As shown in FIG. 5b, the relational database table(s) 1350 is associated with storage type map(s) 1360. A storage type map then maps one or more class types/interfaces attributes 1370 to one or more relational database table(s) 1350.

Typically, objects are defined by an object oriented programming language, such as the C++ programming language. Objects instantiated from class type/interface definitions generated by the relational mapper may be defined as native relational database objects. For example, a native relational database object may include objects instantiated from tables of an Oracle 7 database. For a native relational database class type, all functionality is performed by the relational adapter, including the execution of operations on the attributes of the interface (e.g. the execution of "Get/Set" or "Get" attribute functions).

Figure 6:
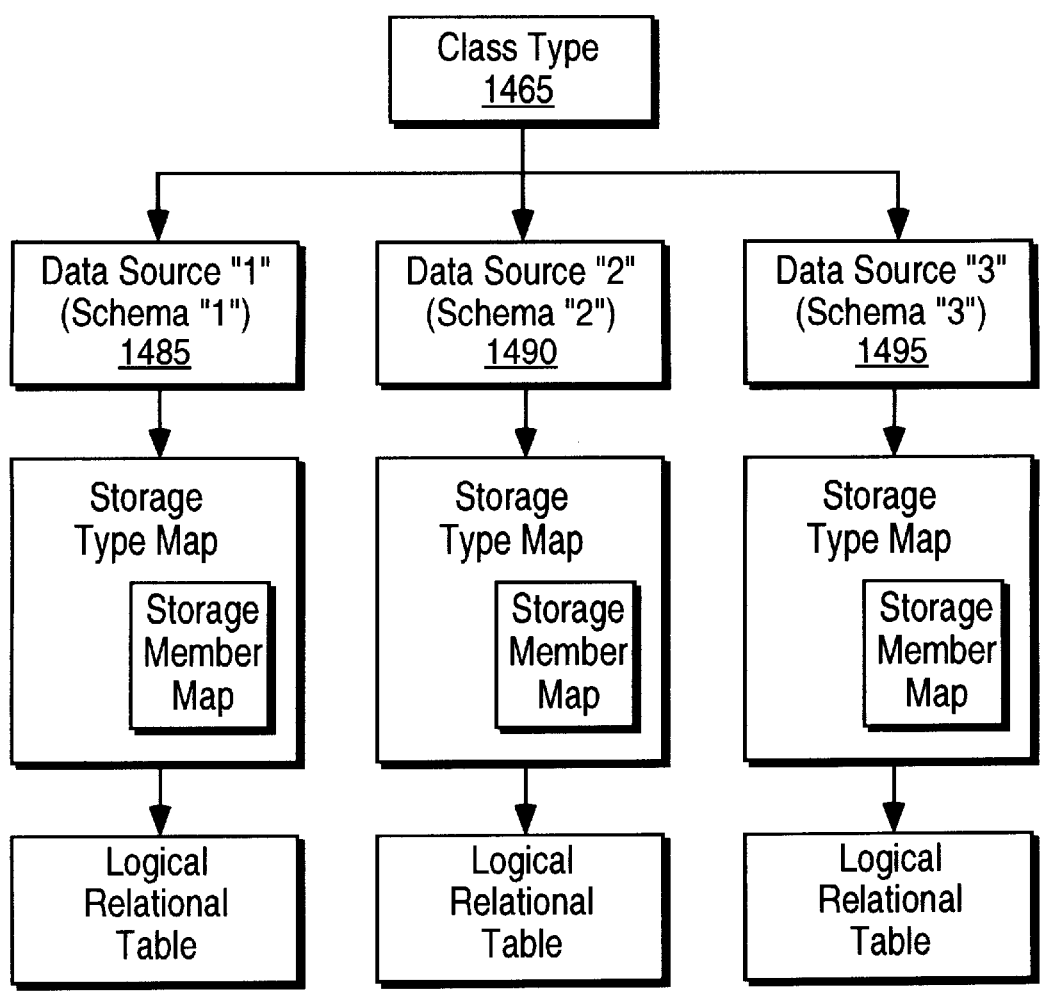
FIG. 6 illustrates an example for using data sources.

Data Sources In Relational Mapping:

As discussed above, a class type may correspond to more than one data source. FIG. 6 is a block diagram illustrating the use of multiple data sources. For this example, a class type 1465 supports data sources 1485, 1490, and 1495. For this embodiment, the data structures of the data sources 1485, 1490, and 1495 have different formats for storing the members of the class type 1465. In addition, the data source members in the different data sources (1485, 1490, and 1495) may be of different types. For the embodiment shown in FIG. 6, the data source 1495 may be used to map an implementation of the class type 1465 to an object oriented database, and the data source 1485 may be used to map an implementation of the class type 1465 to a relational database in a different format.

Multiple data sources for a single class type support type evolution. For example, data source 1485 may support class type 1465 for a first implementation. Subsequently, class type 1465 may be modified (e.g., attributes may be added to the class type 1465). For a second implementation, data source 1490 may support the modified class type 1465 (e.g., data source 1490 may include an additional data source member for the additional class type attribute).

Data sources also have application to permit selecting or modifying the number of attributes in a class type by collapsing several members of a class type to a single data source member. If a storage member map maps each data source member of a data source to a column in a relational table, it may be desirable to collapse several class members into a single column. For the example shown in FIG. 6, the data source 1485 may provide a format to store several members of the class type 1465 into a single data source member. For example, to store a button object in a table in a relational database, multiple attributes of the button class type, such as color, font, font size, etc., may be contained in a single data source member in the data source 1485. The single data source member in the data source 1485 is mapped to a single column in a relational table via the storage member map. For the button object example, the data source 1485 describes how the button object attributes are ordered in the single data source member. Based on the nature of the object, the multiple attributes of the button object do not each require a separate column in the relational table. Thus, the collapsing or consolidating through data sources provides flexibility in the form the objects are stored.

In one embodiment, to support queries, the relational mapper flags data source members or class members that are direct replications of attribute members of the corresponding class type. Thus, a query to a class type, which persists in a relational database, includes traversing the flags to determine whether the particular attribute may be queried. For example, if multiple attribute members are collapsed into a single data source member, then each of the individual attribute members may not be queried. For this example, these attributes would be flagged as nonqueryable.

Figure 7:
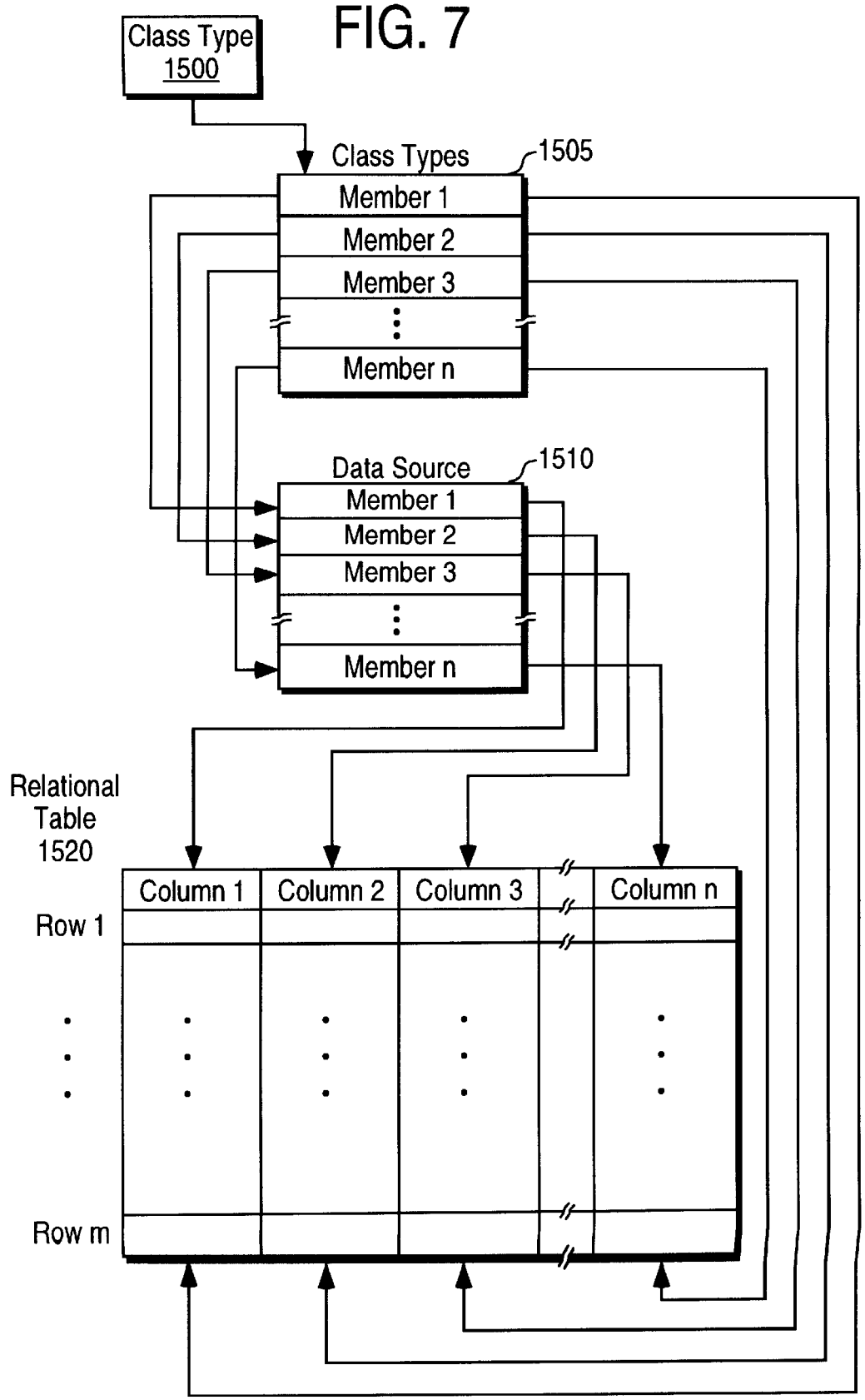
FIG. 7 illustrates an example of relational mapping.

Relational Mapping Embodiments:

FIG. 7 illustrates an example relational mapping. A class type 1500 contains class members 1505 that include a plurality of members, designated as class members "1-n" in FIG. 7. For a one-to-one correspondence, each of the class members, 1-n, of the class type 1505 corresponds to a data source member, 1-n, in the data source 1510 as shown by the lines and arrows in FIG. 7.

A relational table 1520 includes a plurality of columns, 1-n. Each member of the data source 1510 is mapped to a single column as shown by the lines and arrows extending from the data source 1510 to the relational table 1520. The relational table 1520 includes a plurality of rows identified as rows 1-m. The relational adapter 1120 (FIG. 1) utilizes the rows of the relational table 1520 when executing related transactions for the class members of that data source.

The relational mapper of the present invention may be used with any object oriented type system. In one embodiment, the type system includes a plurality of primitive types. In general, the primitive types are the basic building blocks to build class types in the object oriented system. Primitive types include reference types and scalar types. Scalar types further include character strings, integers, floating point numbers, etc. Reference types include references to scalars, known as complex scalars, and references to collections, such as a reference to a collection of interfaces. In one embodiment, the mapping of scalar types and references is implemented differently, as described more fully below.

Attributes of the reference type often participate in associations. Type members that participate in associations are defined as role members or role descriptors, a subset of an attribute member. The relational member map (RelMemberMap) 1245 (FIG. 4) maintains information about the association. Examples of mapping scalar types, reference attributes and complex types is described more fully below.

In general, the storage members map comprise metadata that describes the mapping of data source members to columns in a relational table. In one embodiment, to map a simple scalar attribute, a storage member map sets up an association with a primary key and column. To map a data source member of a reference type, a storage member map sets up an association between a foreign key and a primary key on the table for the class type referenced. An example that more fully describes the mapping of simple scalar and references, including complex scalar and collections, is described more fully below.

Figure 8:
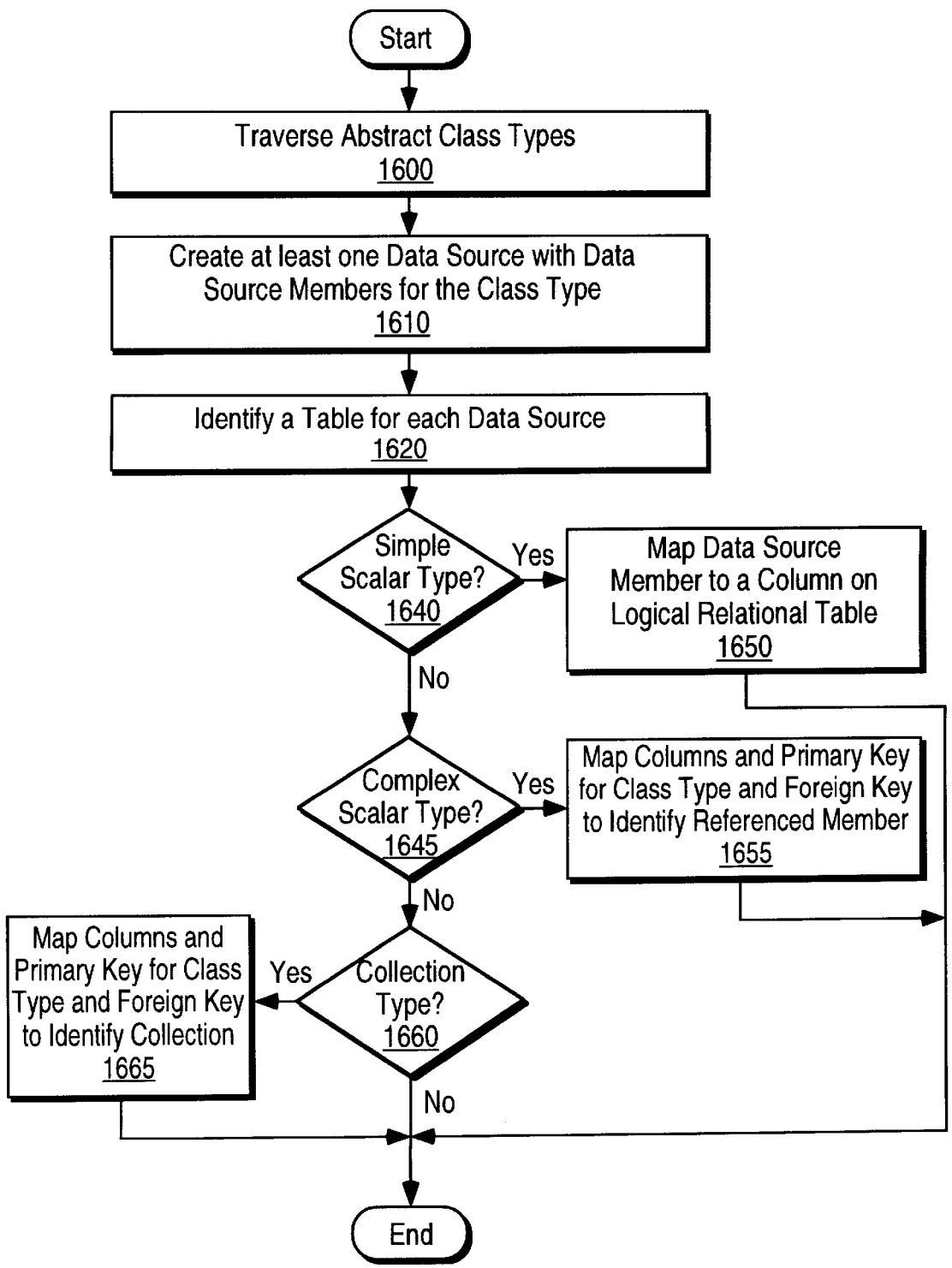
FIG. 8 is a flow diagram illustrating a method for relational mapping in accordance with one embodiment of the present invention.

FIG. 8 is a flow diagram illustrating a method for relational mapping in accordance with one embodiment of the present invention. As shown in block 1600, the relational mapper traverses the abstract class types sought for mapping to a relational data store. As shown in block 1610, the relational mapper creates at least one data source with data source members for each class type. As discussed above, a class type may be mapped to more than one data source. The data source members also have a type, and, in one embodiment, the selection of the data source members directly impacts the format of the corresponding table. For each data source, the relational mapper identifies a table in the relational data store as shown in block 1620. In one embodiment, the table is identified through the relational type map (RelTypeMap) 1240 (FIG. 4).

The relational mapper generates the storage type map to map the data source to the relational database tables. Also, the relational mapper generates metadata to reflect the storage type mapping for each data source. As shown in blocks 1640 and 1650, to generate the storage member map, if the data source member is a simple scalar type, then the relational mapper maps the data source member to a column on the corresponding relational table. Each data source member of the simple scalar type is mapped to the corresponding relational table in this manner, and metadata, which reflects this mapping, is stored in each storage member map. If the type of the data source member is a complex scalar type, then the relational mapper identifies columns and a primary key for the corresponding relational table. In addition, the relational mapper specifies a foreign key to identify the referenced class members (e.g., attributes) as shown in blocks 1645 and 1655. Metadata is stored in a storage type map to reflect the complex scalar type mapping for subsequent access by the relational adapter 1120 (FIG. 1).

As shown in blocks 1660 and 1665, if the data source member is a collection type (e.g., a reference to a collection), then the relational mapper maps columns and primary keys for the corresponding relational table. In addition, the relational mapper maps foreign keys to the table for the referenced data source and collections to identify the collection referenced. The storage member maps are also stored as metadata for subsequent access by the relational adapter 1120 (FIG. 1).

The role descriptors, which are a subset of an attribute type, and the reference data source members are mapped in a special way. In one embodiment, the mapping of role descriptors involves traversing the attribute association. From the attribute association, the relational mapper determines the components required to implement the association. The relational mapper then creates the metadata to describe the implementation of the association. At run time, the relational adapter 1120 traverses the metadata to map a logical association down to a physical association. The map encompasses all of the permutations (e.g., as to whether the object exists at both ends and the form of the object, etc.).

A Relational Mapping Example:

The following is an example human resources model implemented with objects. Each employee has a name, a hire date, and address. The address further includes a street, city, and state. In addition, an employee may have kids. For each kid, the human resources model associates the parent employee and the kid, and the model includes the name and birth date of the kid.

The following example illustrates relational mapping in accordance with one embodiment to implement the human resources model. For this example, a class type C_Emp is defined. The class type C_Emp supports the interface, I_Emp. The attributes/roles for I_Emp are shown in Table 1.

TABLE 1

I_Emp

| Attributes/Roles | Type |
| --- | --- |
| Name | String |
| Hire Date | Date |
| Address | *I_Address |
| I_Kid | *I_Collection |
| (Association with I_Kid) | |

Specifically, Table 1 includes, for the I_Emp interface, the name of the attribute/role and its corresponding type. The attribute "name" is of the string type, and the attribute "hire date" is of the date type. The attribute/role "Address" is a reference. More specifically, the attribute "Address", a complex scalar type, references the I_Address interface.

Table 2 shows the attributes/roles and their corresponding type for the I_Address interface.

TABLE 2

I_Address

| Attributes/Roles | Type |
| --- | --- |
| Street | String |
| City | String |
| State | String |

As shown in Table 2, the I_Address interface includes, as attributes, "street", "city", and "state", all of the string type.

As shown in Table 1, the attribute/role Kids is also contained in the I_Emp interface. The Kids attribute/role is a reference to a collection of interfaces supported by the Kids class type. For this example, the I_Emp interface has an association with the I_Kid interface.

Table 3 contains attributes/roles for the I_Kid interface.

TABLE 3

I_Kid

| Attributes/Roles | Type |
| --- | --- |
| Emp | *I_Emp |
| Name | String |
| Birth date | Date |
| Address | *I_Address |

As shown in Table 3, the I_Kid interface includes a plurality of attributes/roles, including a reference to I_Emp and a reference to I_Address. The I_Kid interface also includes, as attributes/roles, "Name" and "Birth date", of the type string and date, respectively. The I_Kid interface further includes the attribute/role "I_Address" of the reference type. The I_Emp attribute/role is a back pointer to one or more parents that are employees (e.g., the association is between a kid and a parent employee). The association defines how the I_Emp interface relates to the I_Kid interface. The collection, Kids, is a reference to another data source type. Specifically, the Kids is a reference to the collection of I_Kid interfaces. The I_Address attribute in the I_Kid interface is only a reference (e.g., it is not a two way association).

The following example illustrates the mapping of the I_Emp to a relational data store. As discussed above, each of the attribute/roles (e.g., class members) are mapped to columns in a table. Table 4 lists example data source members and their corresponding types for an example C_Emp class type to data source mapping.

TABLE 4

DS_Emp

| Data Source | Type |
| --- | --- |
| DS.Name | String |
| DS.Date | Date |
| DS_Address | Complex |
| Street | |
| City | |
| State | |
| DS Kids | *I_Collection |

Data source members, each of which has a type, may also be a scalar, complex scalar, scalar reference, or collection reference. As shown in Table 4, the data source for the I_Emp interface (e.g., C_Emp class members) includes "DS.Name" and "DS.Date" data source members of the type string and date, respectively. The data source for the interface I_Emp, also includes a data source member, DS_Address, of the type complex scalar. If the reference is not a bi-directional association, then the data source member may include a contained complex object. The contained complex data source is a structure inserted inside the data source member even though it appears as a single data source type (e.g., a complex scalar type). For this example, a contained complex object may include exploding the attributes of the I_Address interface into the data source member DS_Address. For a contained complex type, the attributes for the I_Address interface (e.g., street, city, and state), are contained within the data source member, DS_Address. Alternatively, instead of using a contained complex object, logical data source, for the interface I_Address, is generated to map the "street", "city", and "state" attributes to respective data source members. The data source member "DS_Kids" is a reference type (e.g., a collection of I_Kid).

The relational mapper generates storage member maps to map each data source member to a column in the relational table for the class type, C_Emp. Table 5 includes entries for a storage member map, T_Emp, to map the data source members of the data source e, DS_Emp, to a table for the class type C_Emp.

TABLE 5

T_Emp

| Number | OID |
| --- | --- |
| Varchar 2 | Type_Descriptor |
| Varchar | Name |
| Date | Date |
| Number | FK_Address |
| Number | FK_Kids |

In general, the storage type map T_Emp contains a number of entries to identify the I_Emp table as well as other tables referenced by the data source members in the data source DS_Emp. Specifically, the storage type map entry, "Number", includes the primary key (PK_ID) to identify the relational table for the data source, DS_Emp. The T_Emp storage type map also includes the variables "Varchar" and "Date" of the type string and date, respectively, to specify columns for the data source members "DS.name"

and "DS.date" in the I_Emp table. The storage type map T_Emp includes a number to identify the foreign key address, (FK_Address), of a table corresponding to the data source for the I_Address interface. The storage type map T_Emp also includes a number to identify the foreign key address of the table corresponding to the data source for the I_Kid interface (FK_Kids). The Varchar2, of the type "Type-Descriptor", identifies the specific class within a class hierarchy (e.g., a class type that inherents from a super class type).

If the DS_Address data source member in the DS_Emp data source is not a contained complex object, then the relational mapper generates a storage type map to map the data source members of the DS_Address data source to a relational table for I_Address. Table 6 includes entries of the storage type map to map the DS_Address data source member to the appropriate T_Address relational table.

TABLE 6

| T_Addr | |
|---|---|
| Number | PK_ID |
| Varchar | Street |
| Varchar | City |
| Varchar | State |

The first entry, of the type number, identifies a primary key (PK_ID) for the relational table corresponding to the I_Address table. The next three entries, all of the type varchar, identify columns street, city, and state for the I_Address table.

Table 7 includes entries of a storage type map, T_Kids, to map the I_Kid interface to a relational table.

TABLE 7

| T_Kids | |
|---|---|
| Number | PK_ID |
| Number | FK_Emp |
| Varchar | Name |
| Varchar | Birth date |
| Varchar | FK_Address |

The storage type map T_Kids includes the entry PK_ID, of the type number, to identify a relational table for a data source of the Kids class type. The entry FK_Emp, of the type number, identifies a foreign key for the C_Emp data source relational table. The storage type map T_Kids further includes the name and birth date entries, both of the type varchar, to map the attributes/roles name and birth date to a column on the T_Kids relational table. The last entry, FK_Address, of the type number, is a foreign key for the reference to the C_Address data source relational table.

In one embodiment, the relational mapper of the present invention generates intersection tables when referencing a collection of objects in a foreign system (e.g., the referenced object is not implemented in the current system). For example, the class type C_Emp may have a reference I_Address to an address, and the address is implemented in a foreign object system, such as the Common Object Request Broker Architecture (CORBA) object system. For this example, the I_Address interface is not intended for implementation in the local schema. To handle this, the relational mapper sets up an intersection table to hold all of the address values that are particular to the reference.

Implementing a Relational Mapping Scheme

In one embodiment, the relational mapper of the present invention generates mapping objects. The mapping objects "glue" class types, and members of class types, to relational objects. In a preferred embodiment, the mapping objects are generated via an auto mapper. Embodiments for an auto mapper are discussed more fully below. Table 8 lists four mapping objects to implement mapping of relational databases in an object oriented environment in accordance with one embodiment of the present invention.

TABLE 8

Rel Type Map
Rel Member Map
Storage Type Map
Storage Member Map

The relational type map (RelTypeMap) maps, for each data source of a class type registered with the object oriented environment, class type members to a table in the relational database. Thus, each data source of a class type, stored in a relational database, has a corresponding RelTypeMap. The class types may be mapped to the same relational table. The RelTypeMap has reference to the corresponding class type as well as reference to a root table. In general, the root table defines a class hierarchy of class types.

The RelTypeMap has a collection of attributes, namely a collection of relational member maps (RelMemberMap). As discussed above in conjunction with FIG. 2, each RelMemberMap maps a class member of a class type to a relational table. Accordingly, the RelTypeMaps and RelMemberMaps map information at the abstract specification level so that the mapping is independent of specific implementation of the objects (e.g., C++ implementation of objects).

For this embodiment, the mapping objects also include a storage type and a storage member map. In general, the storage type map maps logical tables, or table objects, to class types. The storage member maps map members of relational objects (e.g., column objects), to members of a class type. For example, the storage member map may map columns of a relational object to attributes on a logical interface supported by a logical class type mapped by the storage type map. Accordingly, the storage type maps and storage member maps are based on the abstract specification, and therefore are not implementation specific (e.g., not bound to a single database implementation).

The relational mapper of the present invention also generates relational objects. The relational objects are not specific to a relational database. The generation of relational objects by the relational mapper permits a logical mapping between class types or data sources to logical relational tables. In one embodiment, a table object is used to create a relational table to implement persistence in accordance with the mapping. A column object, derived from a table object, specifies columns for the corresponding table object. For this embodiment, the relational mapper, through generation of mapping objects and relational objects, only manipulates mapping schema objects. This results in a well defined operation for relational mapping. The use of mapping objects for the relational mapper permits reuse of mapping objects and relational objects where possible.

Figure 9:
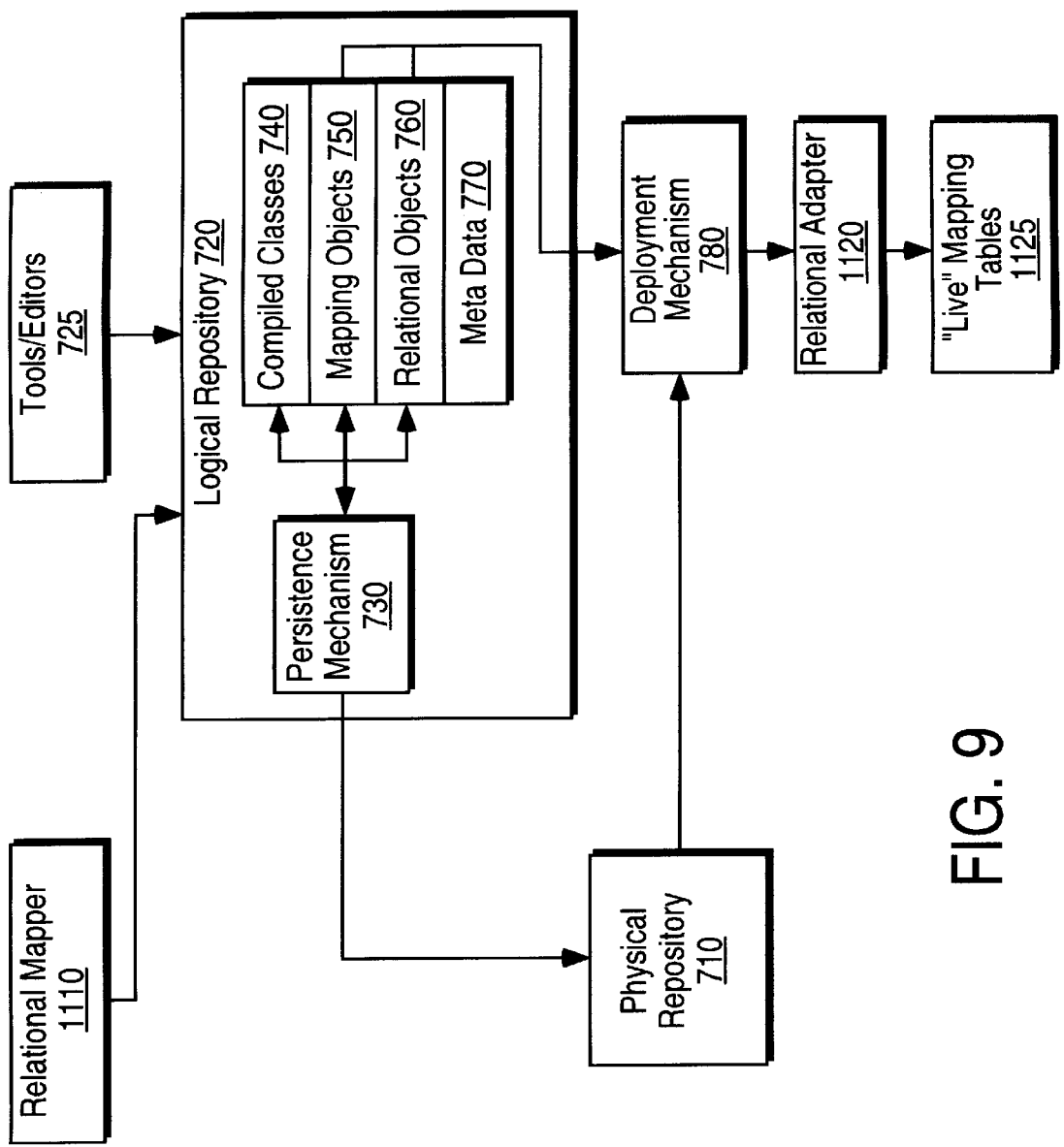
FIG. 9 is a block diagram illustrating the use of a repository by the relational mapper.

Persistence of Mapping Objects:

In one embodiment, the relational mapper of the present invention utilizes a repository. FIG. 9 is a block diagram illustrating the use of a repository by the relational mapper 1110. A logical repository 720 generally specifies a physical storage location for objects. By way of example, the logical repository 720 manages the storage of metadata for describing compiled C++ classes 740, mapping objects 750, and relational objects 760. The logical repository 720 includes a persistence mechanism 730 that executes transactions to store objects and abstract specification to a physical repository 710. The physical repository 710 may be any type of data store, such as a relational database or an object oriented database. As shown in FIG. 9, a deployment mechanism 780 utilizes the logical repository 720 to access mapping objects and relational objects, stored in a physical repository, for deployment to the relational adapter 1120.

As discussed above, relational mapping is a design time process such that mapping objects, relational objects and/or class types/interfaces are generated for subsequent use during run time operation. The use of a repository for relational mapping operations permits persistence of newly created mapping objects, relational objects, and logical class types/interfaces during the design time phase. As illustrated by the arrow pointing from the tools/editor block 725 to the logical repository 720, the tools/editors 725 have access to the mapping objects, relational objects, and class types/interfaces stored in the physical repository 710. As repository objects, the relational mapper 1110 and the tool/editors 725 may use all of the repository services to manipulate the objects, including creating different versions of objects and saving tables in inconsistent states.

The repository replicates mapping objects, relational objects, and class types/interfaces defined by the metadata. The metadata contains information about each object registered with the object oriented system. During the design phase, a user, through use of a tool/editor 725, may create an association between relational objects and other objects supported by the repository. At this stage, the user need not reconcile, associations between the relational objects and other objects as defined by the metadata (e.g., ensure the association exists at both ends). Instead, the reconciliation between associations among objects as defined by the metadata is not required until deployment of the mapping objects to the relational adapter 1120 as "live" mapping tables. Accordingly, the use of the repository with relational mapping permits saving incomplete objects and mapping information during development in the design time phase.

The mapping objects are essentially C++ objects saved to physical storage through the normal persistence mechanism of the repository. For example, C++ objects write through data sources to persist in relational tables. The mapping objects may be saved in the physical repository via any format, including flat file definitions.

The relational mapper 1110, operating on mapping objects, which are full fledged repository objects, has access to all of the objects defined for a particular schema. For example, if an attribute is added to an interface supported by a class type, the relational mapper 1110, as well as the tool/editors 725, have access to all of the mapping objects to edit the mapping objects to map the additional attribute.

As discussed above, metadata describes all objects in a schema. The relational mapper of the present invention is metadata driven, such that the relational mapper has access to the abstract specification of all objects registered with the object mediator 100. Because the system is metadata driven, the relational mapper 1110, which has full access to objects and metadata, may specialize mappings. Accordingly, the mapping objects are full blown repository objects resulting in additional flexibility and functionality for the relational mapper due to the features associated with the repository. For example, relational objects for a schema may be stored in the physical repository even before the objects reference a specific database or database instance. The relational objects (e.g., table and column objects) may then be implemented for a particular schema, or relocated into different schemas.

A logical table object identifies a corresponding RelTypeMap. For example, if a table has been generated, a user may learn which class hierarchies are associated with the table as identified by the root table of the RelTypeMap. If a class type has been edited, as identified by the RelTypeMap, to include new attributes, then the full blown repository mapping schema objects permit a user to generate new RelMemberMaps for the new attributes. Note that without access to the system metadata and the full blown mapping objects, augmentation of the mapping would not be possible.

As shown in FIG. 9, the relational mapper 1110 includes a deployment mechanism 780. In general, the deployment mechanism 780 accesses the mapping objects, through the persistence mechanism of the logical repository, and executes a "compile" phase to generate the "live" mapping tables 1125. The "live" mapping tables 1125 are utilized by the relational adapter 1120. Prior to run time, the mapping objects, defined during the design time phase, are deployed for use by the relational adapter 1120. In general, to deploy mapping objects to a relational adapter, the mapping object definitions are copied into the adapter connection in the object mediator 100. The adapter connection subsequently generates a dynamic link library (DLL) to implement the mapping schema objects for use at run time. The discrete deployment step includes exporting table definitions through the adapter interface to create the "live" mapping tables in the relational adapter interface.

The relational mapper of the present invention supports mapping of private attributes, defined in a class type, to tables in a relational database. The mapping of private attributes supports persistence of private attributes for class types. For purposes of nomenclature, a private attribute is defined as an attribute on a class type that is not exposed through an interface supported by that class type. Generally, as is well known in the art of object oriented software systems, an interface definition language (IDL) is used to define interfaces from compiled C++ classes. The class types support one or more interfaces. A private attribute, which is not part of an interface, is an attribute directly defined on a class type. Thus, private attributes are not exposed through an interface, and consequently are not accessible to external objects. Through use of the relational mapper, private attributes may persist in a relational database.

In one embodiment, private attributes are saved through mapping class type attributes to class members. Specifically, the private attribute is generated as a class member of the class type. To populate an instance of a C++ class with private attributes, a relational adapter 1120 receives a data source defined for that class type. The relational adapter utilizes the table mappings to store the C++ class members in a physical repository.

Figure 10A:
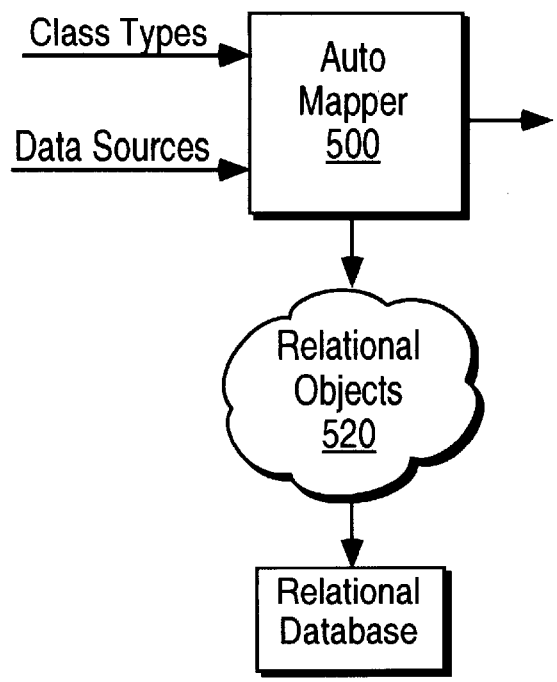
FIG. 10a is a block diagram illustrating one direction of conversion performed by the auto mapper.

Auto Relational Mapping:

In one embodiment, the relational mapper of the present invention includes an auto mapper. Generally, the auto mapper comprises a collection of interfaces to connect or "glue" class types, and members of class types, to relational objects. In one embodiment, the auto mapper is an automated process performed in software to automatically generate the mapping objects. FIG. 10*a* is a block diagram illustrating one direction of conversion performed by the auto mapper. As shown in FIG. 10*a*, the auto mapper 500 receives, as input, class types or data sources, and generates, as output, mapping objects 510 and relational objects 520. The auto mapper 500 is configured to generate the mapping objects 510 and the relational objects 520 in accordance with a predetermined set of rules. For example, to map a class type to a logical relational table, the auto mapper may map each class member, which the class type supports, to a column of the logical relational table.

Figure 10B:
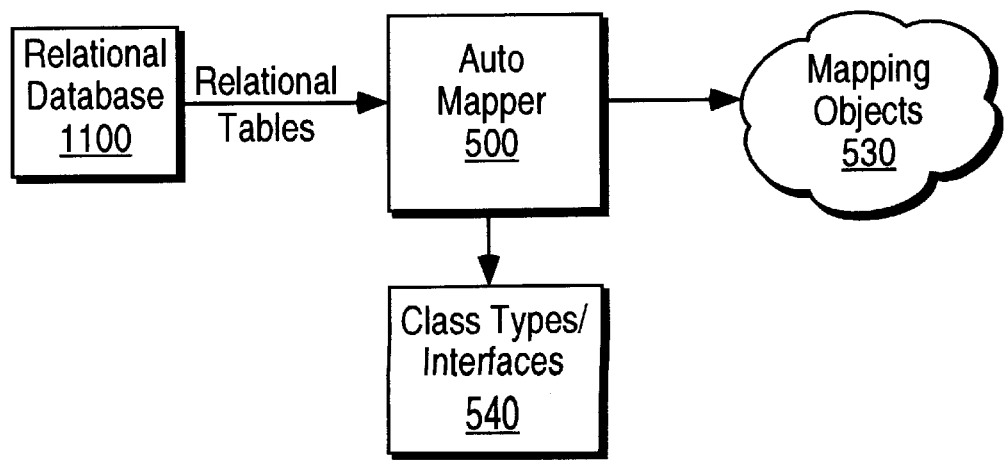
FIG. 10b is a block diagram illustrating conversion from relational database tables to class types/interfaces.

The auto mapper of the present invention is bi-directional. The auto mapper 500 further performs conversion from relational database tables to class types/interfaces. FIG. 10b is a block diagram illustrating conversion from relational database tables to class types/interfaces 540. For this embodiment, the auto mapper 500 receives relational tables, and generates mapping objects as well as the class type/interface definitions.

In one embodiment, the auto mapper is implemented through methods on a relational map manager object (C_RelMapMgr). For this embodiment, the auto mapper consists of two mapping methods: AutoMap ClassTypes( ), AutoMapDataSource( ), and AutoMapTables( ). The AutoMapClassTypes( ) method maps class types to relational objects, including generating mapping and relational objects. The AutoMapDataSources( ) method generates mapping objects and relational objects to map data sources to relational database tables. The auto map method, AutoMapTables( ), maps relational tables to class types/interfaces.

FIG. 11 is a flow diagram illustrating a process for mapping class types to relational tables in accordance with one embodiment for auto mapping of the present invention. As shown in block 910, the AutoMapClassTypes( ) method traverses metadata to learn class hierarchies. The top level class in the class hierarchy is identified as shown in block 920. As shown in block 930, the AutoMapClassTypes( ) method creates a logical table object to correspond to the super type object class in the class hierarchy. As shown in block 940, the AutoMapClassTypes( ) method generates a relational type map (RelTypeMap) for each class type in the class hierarchy. The RelTypeMap may identify a separate table for each class type or a single table for all class types related in the class hierarchy. The AutoMapClassTypes( ) method may include the number of tables to generate as a predefined rule, or the AutoMapClassTypes( ) method may receive parameters to customize the number of tables on a case by case basis. The RelTypeMap identifies a corresponding logical relational table for each class type.

As shown in block 950, the AutoMapClassTypes( ) method traverses each class member for a class type. From the interfaces, the AutoMapClassTypes( ) method identifies attributes (e.g., members of the interface) as shown in block 960. As shown in block 970, a RelMemberMap is generated for each attribute on an interface. The RelMemberMap maps an attribute on an interface to a column object, and maps child objects to parent table objects. As shown in block 980, logical relational table(s) are generated to provide an implementation for the relational objects. For run time operation, the relational objects are then bound to the relational table(s) as shown in block 990.

As discussed above, the relational mapper is bi-directional (e.g., table to class types, and class types to tables). FIG. 12 is a flow diagram illustrating one embodiment for the AutoMapTables( ) method executed in the relational mapper. For the AutoMapTables ( ) method, the auto mapper receives relational tables, and generates class type/interfaces as well as the associated mapping objects. As shown in block 410, the AutoMapClassTypes( ) method creates new class types for each relational table sought to be converted into the object oriented environment. The AutoMapClassTypes( ) method creates a relational type map, RelTypeMap, for each newly created class type as shown in block 420. In one embodiment, the AutoMapClassTypes( ) method assigns names for the new class types based on the corresponding names of tables. For each column of a table, the relational mapper generates a relational member map, RelMemberMap. The RelMemberMap maps columns of the relational table to attributes on the created interface supported by the class type as shown in block 430 of FIG. 12. The AutoMapClassTypes( ) method generates default interfaces for the attributes to support the created class types as shown in block 440. Accordingly, the created class types/interfaces are objects based on relational tables. The integration of relational tables as objects permits a unified object oriented model to fully integrate relational databases in an object oriented environment.

In one embodiment for the relational adapter 1120 (FIG. 1), tables objects and class types/interfaces are imported into the object oriented environment as full blown objects via adapters. The relational objects and newly created class types/interfaces imported into the object oriented environment expose all functionality through the relational adapter in that the relational adapter implements the created class type/interfaces and relational objects. At run time, the relational adapter supports methods to "get/set" or "get" attributes on the interfaces supported by the class types. A user may query, through the relational adapter, an object, instantiated from a class type, to execute methods on these objects. For example, through use of a property inspector editor, the user is permitted to query the class types/interfaces, and objects instantiated from the class types/interfaces.

In addition to importing objects into the object oriented environment via a relational adapter, relational adapted objects may be exported. To export an adapted object, the class information, stored as metadata, is identified. The class type/archive type is input to the auto mapper. The auto mapper generates mapping objects and relational objects based on the class type/archive type specified. A table from a relational database is created to implement the relational objects.

Figure 13:
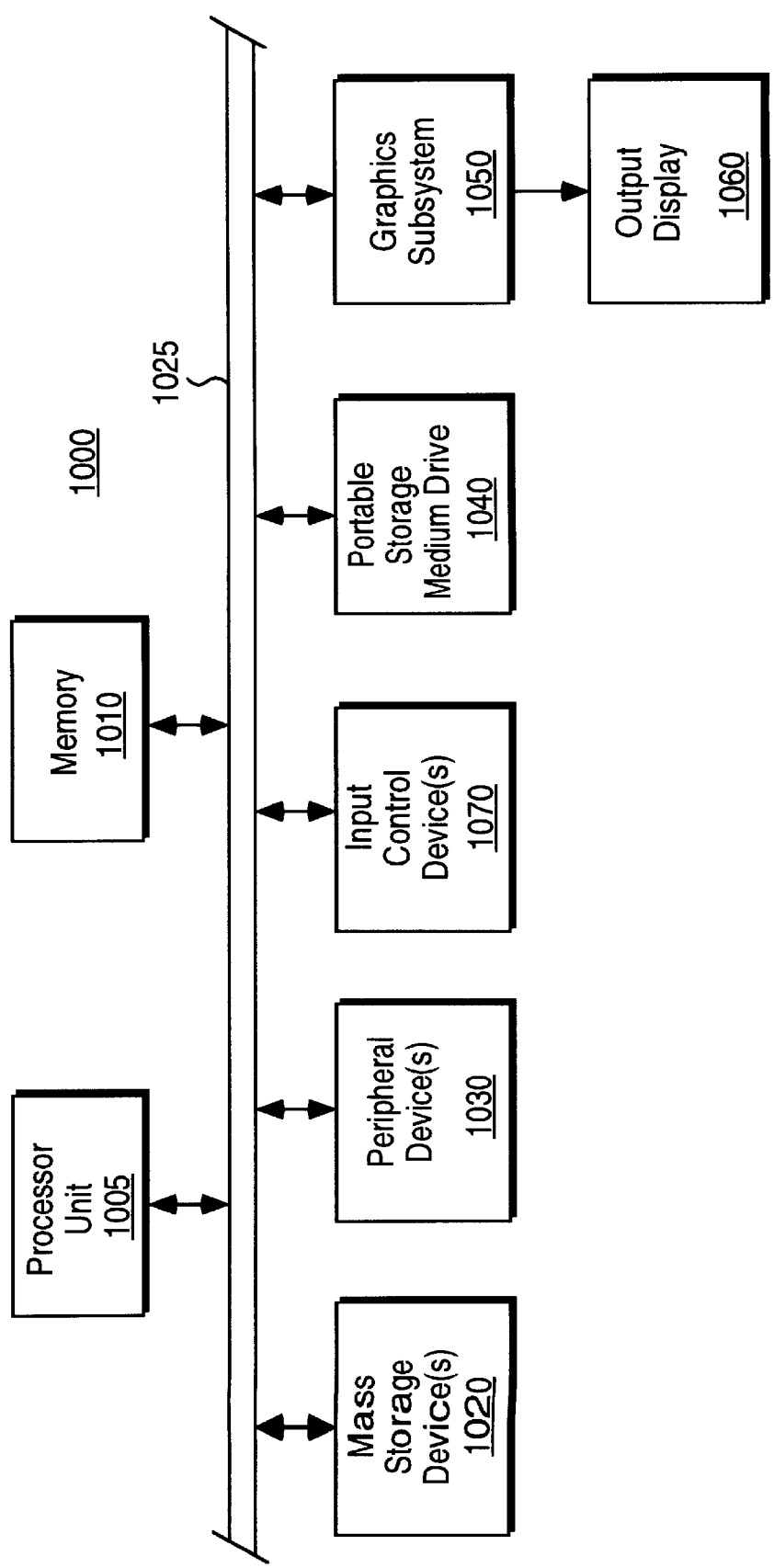
FIG. 13 illustrates a high level block diagram of a general purpose computer system in which the object oriented system of the present invention may be implemented.

Computer System:

FIG. 13 illustrates a high level block diagram of a general purpose computer system in which the object oriented system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the relational mapping system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 11 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the relational mapping software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the relational mapping software is stored on such a portable medium, and it is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. Objects, that originate from data sources remote from the computer system 1000, may be input to the computer system 1000 via a portable storage medium or a network for processing by the relational mapping software.

The input control device(s) 1070 support the user interface for computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include any type of display, such as a cathode ray tube (CRT) display or liquid crystal display (LCD). The graphics subsystem 1050 receives textual and graphical information, and it processes the information for output to the output display 1060. The components contained in the computer system 1000 are those typically found in general purpose computer systems, and in fact, these components are intended to represent a broad category of such computer components that are well known in the art.

In the preferred embodiment, relational mapper is software that includes a plurality of computer executable instructions for implementation on a general purpose computer system. Prior to loading into a general purpose computer system, the relational mapper software may reside as encoded information on a computer readable medium, such as a magnetic floppy disk, magnetic tape, and compact disc read only memory (CD-ROM). The integrated object oriented system may be implemented in hardware. For this embodiment, circuits may be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of storing an object in a relational database, said method comprising the steps of:

selecting at least one class type from an object oriented software system for storage in a table of a relational database, wherein said class type is defined in accordance with a type system of said object oriented software system that includes at least one type system member;

generating class type mapping information, as metadata, to map said class type to a logical relational database table comprising at least one column; and generating member mapping information, as metadata, to map said at least one type system member of said class type to said at least one column of said logical relational database table corresponding to said class type, wherein said mapping information is independent of an implementation of said class type and independent of an implementation of a relational database.

2. The method as set forth in claim 1, further comprising the steps of:

generating mapping tables, for use in said object oriented system, to describe said mapping between said at least one type system member of said class type to said relational database table for said class type;

generating a relational database table from said logical relational database table; and storing objects, instantiated from said class type, in said relational table in accordance with said mapping tables.

3. The method as set forth in claim 1, wherein the step of generating mapping information comprises the steps of:

generating a relational type map object for each class type to specify a mapping for a class type to a relational database table; and generating a relational member map object for each type system member of a class type to specify a mapping of a type system member to a corresponding relational database table.

4. The method as set forth in claim 1, wherein the step of generating a logical relational table comprises the step of:

generating a table object for each logical relational table; and generating at least one column object for each table object to describe columns of said logical relational table.

5. The method as set forth in claim 1, further comprising the steps of storing said mapping information in a physical repository such that said mapping information persists in a data store accessible to said object oriented system.

6. The method as set forth in claim 1, further comprising the steps of generating a logical relational table to support a plurality of class types derived from a single class hierarchy.

7. The method as set forth in claim 1, wherein the step of generating mapping information to map said at least one type system member of said class type to at least one column of said logical relational database table comprises the step of mapping at least one attribute on an interface supported by said class type to a column of said logical relational table that corresponds to said class type.

8. The method as set forth in claim 7, wherein the step of mapping at least one attribute on an interface comprises the step of mapping scalar and complex scalar attributes on an interface supported by said class type to a column of said logical relational table that corresponds to said class type.

9. The method as set forth in claim 7, wherein the step of mapping at least one attribute on an interface comprises the step of mapping a collection of class types to a logical relational table that corresponds to said class type of said collection referenced.

10. The method as set forth in claim 1, wherein the steps of generating mapping information comprises the steps of:

generating class type members, wherein each class type member comprises a type;

defining type system members on said class type as class type members; and mapping said class type members to columns of said logical relational table for said class type.

11. The method as set forth in claim 10, wherein the step of mapping said class type members comprises the step of mapping a private attribute of a class type, not exposed by an interface supported by said class type, to a class type member.

12. The method as set forth in claim 10, further comprises the steps of:
   providing a means to generate an association to associate at least two interfaces supported by a least one class type; and
   providing, through said class type members, a means to constrain an association to specific class types that support said interface of said association.

13. The method as set forth in claim 1, wherein the steps of generating mapping information comprises the step of generating at least one data source for said class type, wherein said data source comprises data source members and defines a data structure to store instances of said class type in accordance with a particular implementation of said class type.

14. The method as set forth in claim 13, further comprising the steps of generating, after modification of a class type, a second data source for said class type that includes data source members that support modification of said class type, wherein objects instantiated from said class type subsequent to modification are supported by said second data source, and objects instantiated from said class type prior to modification are supported by an original data source so that data sources supports legacy objects.

15. The method as set forth in claim 13, wherein the step of mapping members of a class type to said archive members in said archive comprises the step of mapping multiple members of a class type to a single archive member.

16. A method for integrating at least one table of a relational database into in an object oriented system, said method comprising the steps of:
   storing metadata to describe at least one class type and interface registered with said object oriented system;
   analyzing metadata for a schema of objects;
   mapping a table from said relational database to a class type and interface based on said metadata; and
   generating class type and interface definitions for said table in accordance with said mapping, such that said class type and interface definitions permit instantiation of full fledged objects in said object oriented system from tables in said relational database.

17. The method as set forth in claim 16, wherein the step of generating class type and interface definitions comprises the step of generating metadata to describe said class type and interface definitions.

18. The method as set forth in claim 16, wherein the step of mapping tables to class type and interface definitions comprises the step of mapping at least one column of a table to an attribute on an interface supported by a class type.

19. A computer readable medium comprising a set of instructions stored therein, which when executed by a computer, causes the computer to perform the steps of:
   selecting at least one class type from an object oriented software system for storage in a table of a relational database, wherein said class type is defined in accordance with a type system of said object oriented software system that includes at least one type system member;
   generating class type mapping information, as metadata, to map said class type to a logical relational database table comprising at least one column; and
   generating member mapping information, as metadata, to map said at least one type system member of said class type to said at least one column of said logical relational database table corresponding to said class type, wherein said mapping information is independent of an implementation of said class type and independent of an implementation of a relational database.

20. The computer readable medium as set forth in claim 19, further comprising instructions for:
   generating mapping tables, for use in said object oriented system, to describe said mapping between said at least one type system member of said class type to said relational database table for said class type;
   generating a relational database table from said logical relational database table; and
   storing objects, instantiated from said class type, in said relational table in accordance with said mapping tables.

21. The computer readable medium as set forth in claim 19, wherein instructions for generating mapping information comprise instructions for:
   generating a relational type map object for each class type to specify a mapping for a class type to a relational database table; and
   generating a relational member map object for each type system member of a class type to specify a mapping of a type system member to a corresponding relational database table.

22. The computer readable medium as set forth in claim 19, wherein the instructions for generating a logical relational table comprise instructions for:
   generating a table object for each logical relational table; and
   generating at least one column object for each table object to describe columns of said logical relational table.

23. The computer readable medium as set forth in claim 19, further comprising instructions for storing said mapping information in a physical repository such that said mapping information persists in a data store accessible to said object oriented system.

24. The computer readable medium as set forth in claim 19, further comprising instructions for generating a logical relational table to support a plurality of class types derived from a single class hierarchy.

25. The computer readable medium as set forth in claim 19, wherein instructions for generating mapping information to map said at least one type system member of said class type to at least one column of said logical relational database table comprise instructions for mapping at least one attribute on an interface supported by said class type to a column of said logical relational table that corresponds to said class type.

26. The computer readable medium as set forth in claim 25, wherein instructions for mapping at least one attribute on an interface comprise instructions for mapping scalar and complex scalar attributes on an interface supported by said class type to a column of said logical relational table that corresponds to said class type.

27. The computer readable medium as set forth in claim 25, wherein instructions for mapping at least one attribute on an interface comprise instructions for mapping a collection of class types to a logical relational table that corresponds to said class type of said collection referenced.

28. The computer readable medium as set forth in claim 19, wherein instructions for generating mapping information comprise instructions for:
   generating class type members, wherein each class type member comprises a type;
   defining type system members on said class type as class type members; and mapping said class type members to columns of said logical relational table for said class type.

29. The computer readable medium as set forth in claim 28, wherein instructions for mapping said class type members comprise instructions for mapping a private attribute of a class type, not exposed by an interface supported by said class type, to a class type member.

30. The computer readable medium as set forth in claim 28, further comprising instructions for:

providing a means to generate an association to associate at least two interfaces supported by a least one class type; and providing, through said class type members, a means to provide an association to specific class types that support said interface of said association.

31. The computer readable medium as set forth in claim 19, wherein the instructions for generating mapping information comprise instructions for generating at least one data source for said class type, wherein said data source comprises data source members and defines a data structure to store instances of said class type in accordance with a particular implementation of said class type.

32. The computer readable medium as set forth in claim 31, further comprising instructions for generating, after modification of a class type, a second data source for said class type that includes data source members that support modification of said class type, wherein objects instantiated from said class type subsequent to modification are supported by said second data source, and objects instantiated from said class type prior to modification are supported by an original data source so that data sources supports legacy objects.

33. The computer readable medium as set forth in claim 31, wherein the instructions for mapping members of a class type to said archive members in said archive comprise instructions for mapping multiple members of a class type to a single archive member.

34. A computer readable medium comprising a set of instructions stored therein, which when executed by a computer, causes the computer to perform the steps of:

storing metadata to describe all class types registered with said object oriented system;

analyzing metadata for a schema of objects;

mapping a table from said relational database to a class type and interface based on said metadata; and generating class type and interface definitions for said table in accordance with said mapping, such that said class type and interface definitions permit instantiation of full fledged objects in said object oriented system from tables in said relational database.

35. The computer readable medium as set forth in claim 34, wherein instructions for generating class type and interface definitions comprise instructions for generating metadata to describe said class type and interface definitions.

36. The computer readable medium as set forth in claim 34, wherein instructions for mapping tables to class type and interface definitions comprise instructions for mapping at least one column of a table to an attribute o n a n interface supported by a class type.

* * * * *